United States Patent
Cho et al.

(10) Patent No.: US 10,549,685 B2
(45) Date of Patent: Feb. 4, 2020

(54) SOFT UPPER TRIM FOR SWITCH ASSEMBLY OF VEHICLE DOOR AND METHOD OF MANUFACTURING THE SAME

(71) Applicants: SEOYON E-HWA CO., LTD., Seoul (KR); SEOYON AMERICA CORPORATION, Auburn Hills, MI (US)

(72) Inventors: Ji Hyun Cho, Cheonan-si (KR); Dong Suk Kim, Asan-si (KR); Jong Kyu Kim, Cheonan-si (KR)

(73) Assignees: SEOYON E-HWA CO., LTD., Seoul (KR); SEOYON AMERICA CORPORATION, Auburn Hills, MI (US)

( * ) Notice: Subject to any disclaimer, the term of this patent is extended or adjusted under 35 U.S.C. 154(b) by 0 days.

(21) Appl. No.: 16/185,710

(22) Filed: Nov. 9, 2018

(65) Prior Publication Data
US 2019/0275934 A1  Sep. 12, 2019

(30) Foreign Application Priority Data
Mar. 9, 2018  (KR) .................. 10-2018-0027751

(51) Int. Cl.
| | | |
|---|---|---|
| *B60Q 3/217* | (2017.01) | |
| *B60Q 3/54* | (2017.01) | |
| *B60Q 3/64* | (2017.01) | |
| *B29C 69/00* | (2006.01) | |
| *B60R 13/02* | (2006.01) | |

(Continued)

(52) U.S. Cl.
CPC .............. *B60Q 3/217* (2017.02); *B29C 69/00* (2013.01); *B60Q 3/54* (2017.02); *B60Q 3/64* (2017.02); *B60R 13/0243* (2013.01); *G02B 6/0088* (2013.01); *H01H 9/161* (2013.01); *B29K 2023/12* (2013.01); *B29K 2105/04* (2013.01); *B29L 2031/3041* (2013.01); *B60Q 2500/10* (2013.01); *H01H 2219/056* (2013.01); *H01H 2219/062* (2013.01); *H01H 2229/02* (2013.01);

(Continued)

(58) Field of Classification Search
CPC .. B60Q 3/217; B60Q 3/54; B60Q 3/64; B60R 13/0243; H01H 9/161
See application file for complete search history.

(56) References Cited

U.S. PATENT DOCUMENTS

2008/0143132 A1* 6/2008 Okuda .................... B60R 13/02
                                                          296/1.08
2015/0274066 A1* 10/2015 Del Pozo Gonzalez ...................
                                                          B60R 13/02
                                                          362/551

(Continued)

FOREIGN PATENT DOCUMENTS

| JP | 4218660 | 2/2009 |
|---|---|---|
| KR | 101087875 | 11/2011 |
| KR | 20170074740 | 6/2017 |

*Primary Examiner* — William N Harris
(74) *Attorney, Agent, or Firm* — Cantor Colburn LLP

(57) ABSTRACT

Provided is a soft upper trim of a vehicle door, in which an upper substrate, a foam, and a transparent skin are laminated, and particularly, to a soft upper trim for switch assembly of a vehicle door, in which a switch, which is configured to preserve continuity of a transparent skin and display lock and unlock symbols on the transparent skin, is easily assembled to an upper substrate, and a method of manufacturing the same.

3 Claims, 4 Drawing Sheets

(51) Int. Cl.
*F21V 8/00* (2006.01)
*H01H 9/16* (2006.01)
*B29K 23/00* (2006.01)
*B29K 105/04* (2006.01)
*B29L 31/30* (2006.01)

(52) U.S. Cl.
CPC . *H01H 2229/046* (2013.01); *H01H 2229/056* (2013.01)

(56) References Cited

U.S. PATENT DOCUMENTS

| | | | |
|---|---|---|---|
| 2017/0217366 A1* | 8/2017 | Kraemer | B60Q 3/54 |
| 2018/0093609 A1* | 4/2018 | Kautz | B60Q 3/54 |
| 2018/0118102 A1* | 5/2018 | Cho | B60Q 3/54 |

* cited by examiner

SOFT UPPER TRIM FOR SWITCH ASSEMBLY OF VEHICLE DOOR AND METHOD OF MANUFACTURING THE SAME

BACKGROUND

1. Technical Field

The present invention relates to a soft upper trim of a vehicle door, in which an upper substrate, a foam, and a transparent skin are laminated, and particularly, to a soft upper trim for switch assembly of a vehicle door, in which a switch, which is configured to preserve continuity of a transparent skin and display lock and unlock symbols on the transparent skin, is easily assembled to an upper substrate, and a method of manufacturing the same.

2. Description of Related Art

A foamed skin trim 70, 80 (see FIG. 1) at a door trim side for a vehicle is disclosed in the patent document (Korean Patent Registration No. 10-1087875).

That is, a substrate for a door trim 70, 80 of a vehicle is divided into an injection-molded upper substrate, a center substrate, and a lower substrate. The three divided substrates are connected through screws or the like.

In addition, a foam-molded foam 50 and a transparent skin 60 are further laminated on the upper substrate 20 (see FIG. 1).

The foam 50 provides a cushioning sensation by foamed spaces 50a, and the transparent skin 60 provides a luxurious feeling, such as a leather feeling.

On the other hand, in the patent document (Japanese Patent Publication No. 4218660), as illustrated in FIGS. 2 and 3, when a driver puts a hand near a driving seat, operating symbols are displayed on a decorative panel 14, and the driver presses a desired operating symbol to operate.

That is, a switch device 10 configured to display a symbol is a hidden switch type which is embedded in a substrate of a door trim 12 of a vehicle.

The hidden switch device 10 has a structure which is embedded only in a hard substrate. In particular, the hidden switch device 10 is embedded to be disposed between an upper portion and a lower portion of a lower trim.

Therefore, drivers who get out of the vehicle may not check a symbol inside the vehicle through a window.

In particular, after a door is locked or unlocked, when drivers get out of the vehicle, the drivers tend to check the symbol through the window, but such a demand may not be satisfied.

Above all, when the conventional switch device 10 is mounted on an upper trim, holes, into which the switch device 10 is inserted, should be formed in the transparent skin 60 and the foam 50, and after the switch is mounted, a finishing treatment should be performed with the transparent skin 60. However, the finishing treatment is postprocessed and thus may not attractive and likely to drop a price of the vehicle.

Due to the possibility of damage of the transparent skin 60, the conventional hidden switch device 10 has been embedded in a hard substrate as illustrated in FIGS. 2 and 3.

Meanwhile, in the patent document (Korean Patent Laid-Open Publication No. 10-2017-0074740), since a switch is provided on a substrate, the same problem arises similarly to the patent document (Japanese Patent Publication No. 4218660).

PRIOR-ART DOCUMENTS

Patent Documents (Patent Document 1) Korean Patent Registration No. 10-1087875
(Patent Document 2) Japanese Patent Publication No. 4218660
(Patent Document 3) Korean Patent Laid-Open Publication No. 10-2017-0074740

SUMMARY

1. Technical Problem

The present invention has been made to solve the above-mentioned problems, and a technical objective of the present invention is to provide a soft door trim for switch assembly of a vehicle, which is capable of displaying symbols on a transparent skin on an upper door trim thereof without damaging the transparent skin, and a method of manufacturing the same.

2. Solution to Problem

In order to achieve the above objects, a method of manufacturing a soft upper trim for switch assembly of a vehicle door described in claim 1 of the present invention includes: (a) double injection-molding an upper substrate and a light guide plate on a lower surface of a foam-molded foam in an inserted state such that an upper surface of the upper substrate, into which a switch module is inserted, is placed on the same line as an upper surface of the light guide plate; (b) forming a hole in the foam up to a position where the light guide plate is placed; (c) vacuum-pressing a pre-heated transparent skin on the foam in an in-mold grain mold; and (d) engraving a symbol in a rear surface of the light guide plate at a position corresponding to the hole.

A soft upper trim for switch assembly of a vehicle door described in claim 2 includes an upper substrate, a foam, and a transparent skin, which are laminated, wherein a recessed groove, into which a switch module is inserted, is formed in the upper substrate, a light guide plate placed on the same line as the upper surface of the upper substrate is injection-molded above the recessed groove, and a symbol is engraved in a rear surface of the light guide plate. In the soft upper trim described in claim 2 of the present invention, the light guide plate includes side plates, an upper plate which connects upper surfaces of the side plates and has the symbol engraved therein, and flanges which are formed at lower ends of the side plates, wherein an accommodation groove, in which an upper side of the switch module is inserted and accommodated, is further formed inside a lower side of the light guide plate.

3. Advantageous Effects

The present invention has the following effects.

Since an upper substrate and a light guide plate are double injection-molded in a state in which foam is inserted, a process can be simplified, and the light guide plate can be applied to have a minimal thickness. Accordingly, it is very advantageous to secure visibility.

in addition, since a switch module is installed in a recessed groove of an upper substrate, which is formed on a lower surface of a light guide plate, continuity of a conventional transparent skin is maintained to secure both of a hidden property of the switch module and smoothness of a transparent skin, thereby providing an excellent external appearance.

In particular, since holes are formed in a non-transparent foam up to a position where symbols are placed, light illuminated on a pattern of the symbols is clearly illuminated on the transparent skin.

Furthermore, since symbols are displayed on an upper substrate at a specific position close to a window, it is possible to check the symbols in the inside of a vehicle as well as through the window from the outside of the vehicle. In particular, it is possible to check whether a door is properly locked (when symbols are formed on a center substrate or a lower substrate, it is difficult or impossible for a driver to check the symbols inside or outside the vehicle).

Since an accommodation groove, in which an upper side of a switch module is accommodated, is formed in a center of a lower surface of a light guide plate, a thickness of an upper plate of the light guide plate is reduced by a thickness of the accommodation groove to considerably improve transmittance so that transmissivity can be highly improved and thus clearness of symbols can further be improved, and the accommodation groove can additionally function to fix the switch module.

In addition, since a flange is formed at a lower side of a light guide plate, during double injection molding, the flange passes through an upper substrate to completely prevent the light guide plate from being separated.

Figure 1:
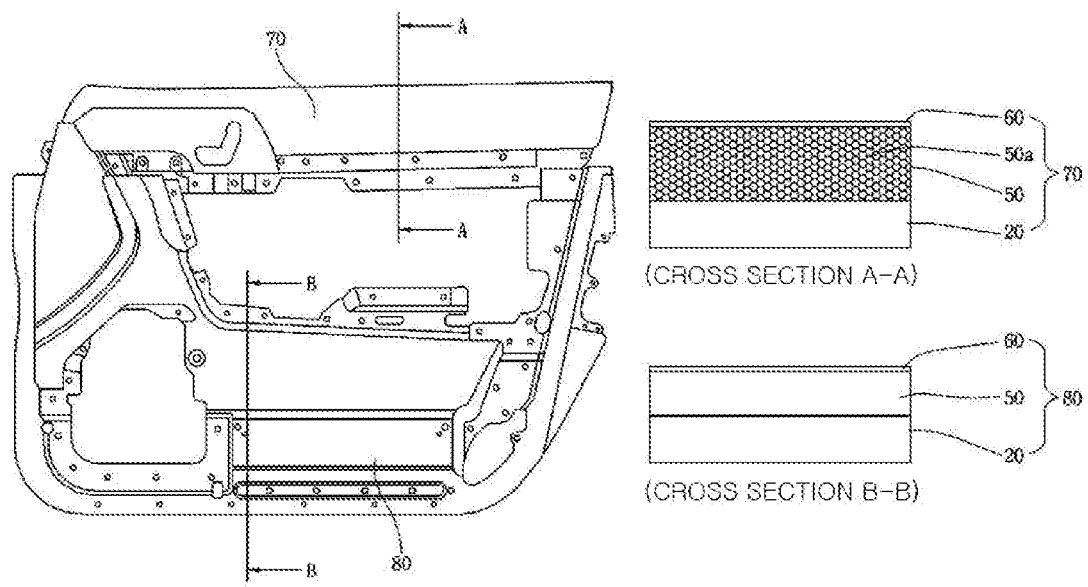
FIG. 1 illustrates a view of a conventional soft door trim for a vehicle and is cross-sectional views of upper and lower trims thereof.
Figure 2:
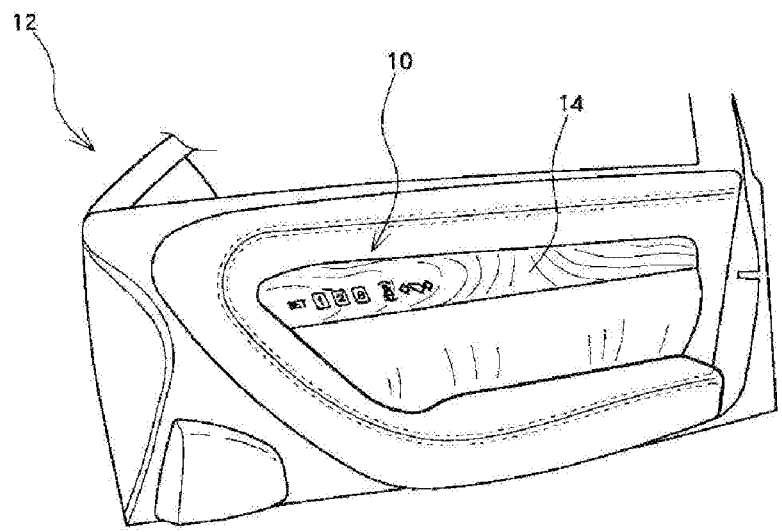
FIGS. 2 and 3 are diagrams illustrating an interior of a front seat door provided with a conventional switch device for a vehicle and illustrating states in which symbols of the switch device are displayed and not displayed.
Figure 3:
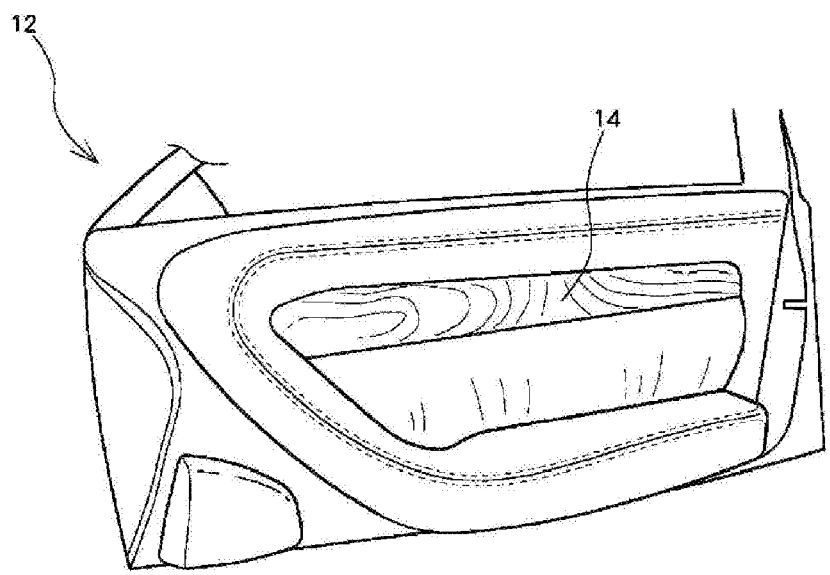

| (Description of Symbols) | |
|---|---|
| 100: soft upper trim for switch assembly of a vehicle door | |
| 1: switch module | 3: switch |
| 5: bezel | 200: upper substrate |
| 210: through-hole | 300: light guide plate |
| 305: accommodation groove | 315: lock and unlock symbols |
| 400: foam | 500: transparent skin |
| 700: holes | |

DETAILED DESCRIPTION OF EMBODIMENTS

Hereinafter, exemplary embodiments of the present invention will be described in detail with reference to the accompanying drawings. The same reference numerals will be given to the same parts as conventional parts, and detailed description thereof will be omitted.

Figure 4:
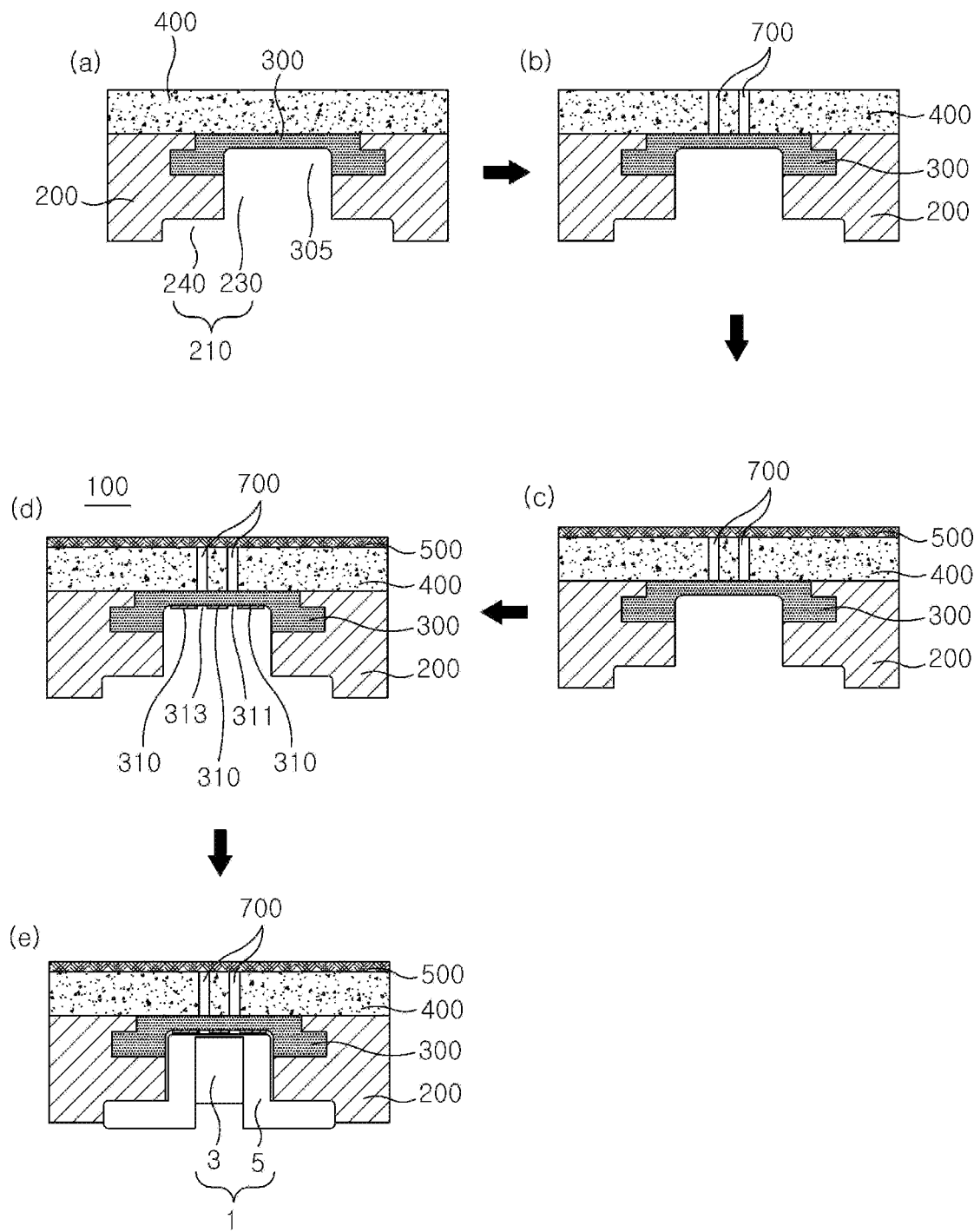
FIG. 4 is a set of sequence diagrams illustrating a method of manufacturing a soft upper trim for switch assembly for a vehicle door according to an exemplary embodiment of the present invention.
Figure 5:
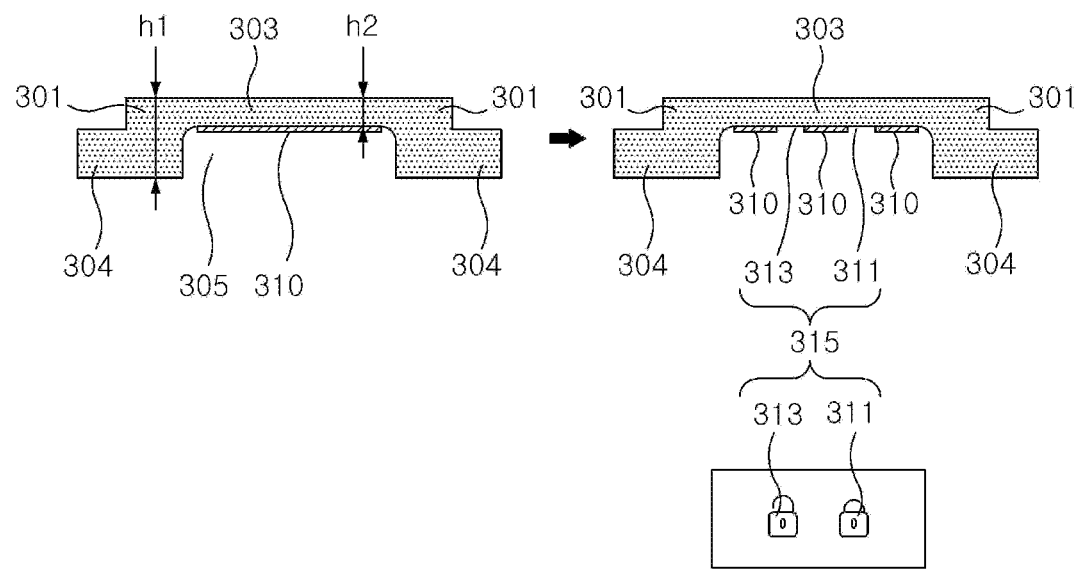
FIG. 5 is a diagram illustrating a state in which symbols are engraved in a light guide plate of FIG. 4.
Figure 6:
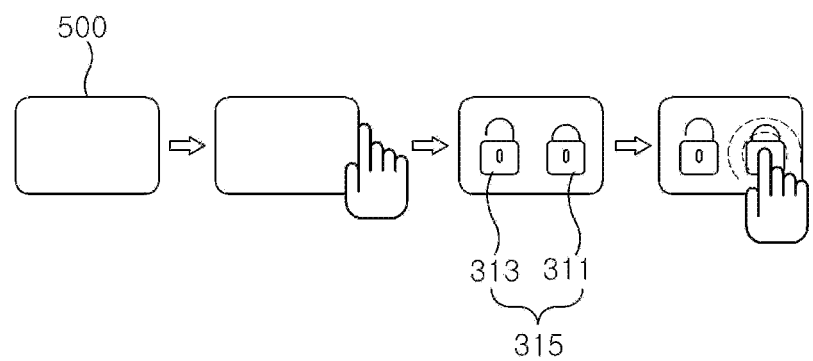
FIG. 6 is a set of operational sequence diagrams of a hidden switch.

FIG. 4 is a set of sequence diagrams illustrating a method of manufacturing a soft upper trim for switch assembly for a vehicle door according to an exemplary embodiment of the present invention. FIG. 5 is a diagram illustrating a state in which symbols are engraved in a light guide plate of FIG. 4. FIG. 6 is a set of operational sequence diagrams of a hidden switch.

As illustrated in FIG. 4D, a soft upper trim 100 for switch assembly of a vehicle door according to the present embodiment includes a foam 400, an upper substrate 200 and a light guide plate 300 double injection-molded on a lower surface of the foam 400, holes 700 formed in the foam 400, and a transparent skin 500 vacuum-pressed on an upper surface of the foam 400.

The foam 400 has a thickness of about 2 mm to 5 mm and is a foam which is made of polypropylene (PP) and foam-molded in advance.

The upper substrate 200 and the light guide plate 300 are double injection-molded so as to be in contact with the lower surface of the foam 400 in a state in which the foam 400 is inserted.

When the upper substrate 200 is made of an acrylonitrile butadiene styrene (ABS) material and the light guide plate 300 is made of a polycarbonate (PC) material, the upper substrate 200 and the light guide plate 300 have a high affinity with each other when being double injection-molded.

That is, the upper substrate 200 and the light guide plate 300 are injection-molded such that a recessed groove 210 is formed in the upper substrate 200 and the light guide plate 300 placed on the same line as an upper surface of the upper substrate 200 is disposed above the recessed grooves 210.

As illustrated in FIG. 4A, the recessed groove 210 has a first recessed groove 230 into which a switch module 1 is inserted, and a second recessed groove 240 on which the switch module 1 is caught. The light guide plate 300 may be a material affiliated to engineering plastic such as polycarbonate (PC) and may function to diffuse light of a light-emitting diode (LED (not shown)) of a switch device 3 in the switch module 1.

In addition, as illustrated in FIG. 5, after an opaque paint 310 is applied as masking on a rear surface of the light guide plate 300, patterns corresponding to a lock symbol 311 and an unlock symbol 313 are formed by cutting and removing the opaque paint 310 using a laser. A film, on which symbols 315 are formed, may be attached instead of the masking.

Therefore, when light is emitted through the light guide plate 300, the light may pass through only the lock and unlock symbols 311 and 313. Accordingly, a driver may view the lock/unlock symbols 311 and 313.

As illustrated in FIG. 5, the light guide plate 300 includes side plates 301, an upper plate 303 which connects upper surfaces of the side plates 301 and has the symbols 311 and 313 engraved therein, and flanges 304 formed at lower sides of the side plates 301. An accommodation groove 305, in which an upper side of the switch module 1 is inserted and accommodated, is further formed inside a lower side of the light guide plate 300.

Therefore, since a thickness h2 of the upper plate 303 is less than a thickness h1 of the light guide plate 300, light may be more clearly diffused and pass through the upper plate 303.

In addition, since the upper side of the switch module 1 is accommodated and assembled in the accommodation groove 305, the additional fixing of the switch module 1 is much better.

The flange 304 serves as a wedge which passes through the upper substrate 200 and completely prevents the light guide plate 300 from being separated upwardly and downwardly from the upper substrate 200.

When the upper substrate 200 and the light guide plate 300 are double injection-molded on the lower surface of the foam 400 as described above, as illustrated in FIG. 4B, the holes 700 are bored using a laser.

These holes 700 serve as a passage through which light of the LED (not shown) of the switch module 1 is irradiated.

That is, since the non-transparent foam 400 covers an entire upper surface of the light guide plate 300, light does not pass through the light guide plate 300. Thus, it is necessary to form the holes 700.

As illustrated in FIG. 4D, the holes 700 are positioned at a similar position to where the symbols 315 formed on the rear surface of the light guide plate 300 are positioned.

That is, the holes 700 have two holes, i.e., a hole corresponding to the lock symbol 311 and a hole corresponding to the unlock symbol 313 and allow light to be illuminated such that clear symbols are displayed.

The holes 700 serve as a passage through which light passes, and thus, the symbols 315 are displayed on the transparent skin 500.

The transparent skin 500 is vacuum-pressed on the upper surface of the foam 400 in an in-mold grain (IMG) mold.

Since an upper mold of the IMG mold has air-permeability and has an embossed portion engraved therein, the embossed portion (leather pattern or the like) is naturally transferred onto a skin during molding.

The transparent skin 500 is a non-textured sheet. The transparent skin 500 may be a thermoplastic olefin (TPO) or polyvinyl chloride (PVC) fabric which is preheated.

The transparent skin 500 may have a thickness of 1.0 mm or more and a transmittance of about 10% to 15%.

The TPO fabric is a material which is widely used as an interior material of a vehicle.

The switch module 1 includes a switch device 3 which includes lock and unlock-corresponding LEDs, a printed circuit board (PCB), and the like, and a bezel 5 on which the switch device 3 is mounted.

A method of manufacturing the above-described a soft upper trim 100 for switch assembly of a vehicle door described above will be described with reference to FIG. 4.

As illustrated in FIG. 4A, in a state in which a foam-molded foam 400 is inserted, an upper substrate 200 and a light guide plate 300 are double injection-molded on a lower surface of the foam 400 such that an upper surface of the upper substrate 200, into which a switch module 1 is inserted, is placed on the same line as an upper surface of a light guide plate 300.

When the upper substrate 200 and the light guide plate 300 are double injection-molded on the foam 400, as illustrated in FIG. 4B, scoring is performed with a laser to bore holes 700 in the foam 400 up to a position where an upper surface of the light guide plate 300 is placed.

When the holes 700 are formed, as illustrated in FIG. 4C, a preheated transparent skin 500 is placed on the foam 400 and is vacuum-pressed in an IMG mold.

After the transparent skin 500 is vacuum-pressed on the foam 400, as illustrated in FIG. 4D, symbols 315 are engraved in a rear surface of an upper plate 303 in the light guide plate 300 at positions corresponding to the holes 700.

As illustrated in FIG. 4E, the switch module 1 is assembled to the soft upper trim 100 for switch assembly of a vehicle door as manufactured above.

The soft upper trim assembled with the switch module 1 is coupled to a center trim, and a lower trim and is assembled and used as a final interior material of a vehicle door.

Accordingly, as illustrated in FIG. 6, when a driver's hand approaches within 15 mm of the transparent skin 500 at a position where the hidden switch module 1 is assembled, a proximity sensor senses the hand, and light of an LED passes through the holes. Thus, only the lock/unlock symbol 315 are displayed on the transparent skin 500.

When a desired symbol is touched among the displayed lock/unlock symbols 315, light of an undesired symbol is turned off, and the desired symbol is turned off after a few seconds, operation of the switch module 1 is ended.

To turn off the symbols 315, a light irradiation time of the LED may be set.

In addition, although it has been described that the symbols 315 are lock/unlock patterns, the symbols 315 also include an operation symbol for performing functions inside a vehicle or an illumination symbol on which a lighting pattern for LED mood lighting is formed.

While the exemplary embodiments of the present invention are susceptible to various modifications and alternative forms, specific exemplary embodiments thereof are shown byway of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

The invention claimed is:

1. A method of manufacturing a soft upper trim for a switch assembly of a vehicle door, the method comprising:
   (a) double injection-molding an upper substrate and a light guide plate on a lower surface of a foam-molded foam in an inserted state such that an upper surface of the upper substrate, into which a switch module is inserted, is placed on a same line as an upper surface of the light guide plate;
   (b) forming a hole in the foam-molded foam up to a position where the light guide plate is placed;
   (c) vacuum-pressing a preheated transparent skin on the foam-molded foam in an in-mold grain mold; and
   (d) engraving a symbol in a rear surface of the light guide plate at a position corresponding to the hole.

2. A soft upper trim for a switch assembly of a vehicle door, the soft upper trim comprising:
   an upper substrate, a foam, and a transparent skin which have been laminated wherein;
   a recessed groove formed in the upper substrate, a switch module being inserted into the recessed groove;
   a light guide plate injection-molded above the recessed groove, the light guide plate being placed on a same line as an upper surface of the upper substrate; and
   a symbol engraved in a rear surface of the light guide plate.

3. The soft upper trim according to claim 2, wherein the light guide plate includes: side plates; an upper plate connecting upper surfaces of the side plates and having the symbol engraved therein; flanges formed at lower ends of the side plates; and an accommodation groove formed inside a lower side of the light guide plate, an upper side of the switch module being inserted and accommodated in the accommodation groove.

* * * * *